United States Patent [19]

Willenbring

[11] 4,355,748

[45] Oct. 26, 1982

[54] FILM ADVANCE BREAKAWAY MECHANISM FOR SLIDE MOUNTER

[75] Inventor: Armer J. Willenbring, Bloomington, Minn.

[73] Assignee: Pako Corporation, Minneapolis, Minn.

[21] Appl. No.: 202,600

[22] Filed: Oct. 31, 1980

[51] Int. Cl.[3] .......... G03B 1/22

[52] U.S. Cl. .......... 226/67; 226/68

[58] Field of Search .......... 226/67, 49, 68, 50, 226/51; 352/183, 189, 186

[56] References Cited

U.S. PATENT DOCUMENTS

| | | | |
|---|---|---|---|
| 1,832,034 | 11/1931 | Lashar | 226/67 X |
| 2,168,043 | 8/1939 | O'Grady | 226/68 |
| 3,279,666 | 10/1966 | Graves | 226/67 |
| 3,341,960 | 9/1967 | Florjancic et al. | 40/152 |
| 3,470,642 | 10/1969 | Mundt et al. | 40/152 |
| 3,478,456 | 11/1969 | Mundt et al. | 40/152 |
| 3,524,299 | 8/1970 | Mundt et al. | 53/23 |
| 3,562,074 | 2/1971 | Mundt et al. | 156/580 |
| 3,570,342 | 3/1971 | Mundt | 83/89 |
| 3,572,567 | 3/1971 | Claar | 226/67 |
| 3,614,854 | 10/1971 | Mundt et al. | 53/381 R |
| 3,756,491 | 9/1973 | Morijama | 226/67 |
| 3,788,031 | 1/1974 | Florjancic | 53/123 |
| 3,807,121 | 4/1974 | Mundt et al. | 53/23 |
| 3,943,029 | 3/1976 | Mundt et al. | 156/108 |
| 3,977,280 | 8/1976 | Mundt et al. | 83/42 |
| 4,004,340 | 1/1977 | Urban | 29/417 |
| 4,123,153 | 10/1978 | Brucat | 226/67 |
| 4,135,343 | 1/1979 | Urban et al. | 156/108 |

OTHER PUBLICATIONS

Catalog Sheet Entitled "Pako Consumer Slide Mounting Kits", Pako Corporation, Dated 8-75.

Brochure, Entitled "Pakon Mount System/Pako", Pako Corporation, Dated 6/79, Operating Manual Entitled "Operating Instructions for Semi-Automatic Mounters Types 6001 and 7004", Dated Aug. 1977.

*Primary Examiner*—Edward J. McCarthy

*Attorney, Agent, or Firm*—Kinney, Lange, Braddock, Westman and Fairbairn

[57] ABSTRACT

A photographic slide mounter includes a film advance mechanism which advances a photographic film web along a film track to insert the end of the film web into a photographic slide frame. The film advance mechanism includes a guide track parallel to the film track and a carriage which is movable on the guide track. A film advance pawl is connected to and movable with the carriage. The pawl engages sprocket holes in the film to advance the film as the carriage is advanced toward a first end of the film track. A drive mechanism advances the carriage toward the first end of the guide track during one portion of an operating cycle, and returns the carriage to the second end during another portion of the operating cycle. The film advance mechanism includes a breakaway mechanism for disconnecting the carriage and the drive mechanism when resistance to advancement of the carriage exceeds a predetermined amount. This prevents the pawl from tearing the sprocket holes of the film in the event the film, for some reason, is resisting movement.

7 Claims, 4 Drawing Figures

FILM ADVANCE BREAKAWAY MECHANISM FOR SLIDE MOUNTER

REFERENCE TO CO-PENDING APPLICATIONS

Reference is made to co-pending U.S. patent application Ser. No. 144,284, filed May 9, 1980, and co-pending U.S. patent application Ser. No. 152,023, filed May 30, 1980, both of which are assigned to the same assignee as the present invention.

BACKGROUND OF THE INVENTION

1. Field of the Invention

The present invention relates to photographic film advance mechanisms for slide mounting apparatus.

2. Description of the Prior Art

Photographic slides are produced by mounting a photographic film transparency in a slide mount frame so that the image of the photographic transparency is aligned with the aperture of the frame. A variety of different types of mounting frames and mounting apparatus have been developed.

One particularly advantageous type of photographic slide mount is the Pakon slide mount, which is a one-piece plastic slide mount sold by Pako Corporation, the assignee of the present application. The film transparency is mounted by opening a film insertion slot in the slide mount by means of mounting equipment. The transparency slides into the mount and the mount is closed. The spring-like properties of the plastic slide mount material provides a safe and tight fit of the transparency in the slide mount without the need of welding or sealing.

U.S. patents showing slide mounts and slide mounting apparatus of this general type include the following patents:

| | |
|---|---|
| Florjancic et al U.S. Pat. No. | 3,341,960 |
| Mundt et al | 3,470,642 |
| Mundt et al | 3,478,456 |
| Mundt et al | 3,524,299 |
| Mundt et al | 3,562,074 |
| Mundt | 3,570,342 |
| Mundt et al | 3,614,854 |
| Florjancic | 3,788,031 |
| Mundt et al | 3,807,121 |
| Mundt et al | 3,943,029 |
| Mundt et al | 3,977,280 |
| Urban | 4,004,340 |
| Urban et al | 4,135,343 |

Apparatus has been developed for both manual and automatic mounting of transparencies in Pakon slide mounts. The manual mounting procedure utilizes a handheld mounting device into which the slide mount is inserted. By grasping the mount and the mounter together at one side, the film insertion opening is widened to permit insertion of a transparency in the slide mount. The transparency has previously been cut from a strip of photographic film containing many individual transparencies and is inserted manually into the slide mount.

While the hand mounting apparatus and procedure is adequate for mounting small quantities of transparencies in slide mounts, it clearly is not suitable for large-scale production of mounted transparencies as is required in commercial photofinishing laboratories. The Pakon Slide Mounter sold by Pako Corporation is an automatic, motor-driven apparatus which mounts photographic film transparencies in Pakon slide mounts at rates of up to 160 slide per minute.

In some cases, however, the quantity of slides to be mounted by a photofinishing laboratory is not large enough to justify the use of automatic slide mounting apparatus such as the Pakon Slide Mounter, yet is greater than that which can be efficiently performed manually. To meet this need, semi-automatic slide mounters have been developed, such as the Type 6001 and 7004 slide mounters developed by Geimuplast Peter Mundt KG. These semi-automatic slide mounters operate generally in a similar manner to the automatic Pakon Slide Mounter, but are driven by an operating handle which is moved by the operator, rather than being motor driven.

One problem which can occur in both motor driven automatic slide mounters and in semi-automatic slide mounters is that under certain conditions the film will resist movement due to jamming of the film itself, or due to some other malfunction in the slide mounter. When this occurs, it is important that the film advance mechanism of the slide mounter not damage the film. This is particularly important in those slide mounters which utilize a film advance pawl which engages the sprocket holes of the photographic film. In these devices, there is a danger of the film advance pawl tearing the sprocket holes of the film in the event that the film jams, binds, or otherwise resists advancement due to malfunction.

SUMMARY OF THE INVENTION

The present invention is an improved film advance mechanism which is particularly useful in slide mounter apparatus in which photographic film is advanced along a film track. The apparatus of the present invention includes a guide track positioned parallel to the film track and carriage means movable on the track between the first end and the second end. Drive means advance the carriage means toward the first end during one portion of an operating cycle of the apparatus, and return the carriage to the second end during another portion of the operating cycle. A film advance pawl is connected to and movable with the carriage means. The pawl engages sprocket holes in the film to advance the film as the carriage means advances. The present invention includes means for disconnecting the carriage means and the drive means when resistance to advancement of the carriage means exceeds a predetermined amount. As a result, the present invention avoids damage to the film, such as tearing of sprocket holes by the film advance pawl, in the event of jamming or binding of the film along the film track, or resistance to movement of the film due to a malfunction of the film supply, which supplies the film web to the film track.

DETAILED DESCRIPTION OF THE PREFERRED EMBODIMENTS

FIGS. 1, 2A, 2B and 3 show a semi-automatic slide mounter which utilizes the mechanism of the present invention. In the embodiments shown in the Figures, the slide mounter is actuated by operating lever 10, which has a handle 12 at its outer end. The operator grasps handle 12, and moves handle 12 (and lever 10) through an operating cycle.

Figure 1:
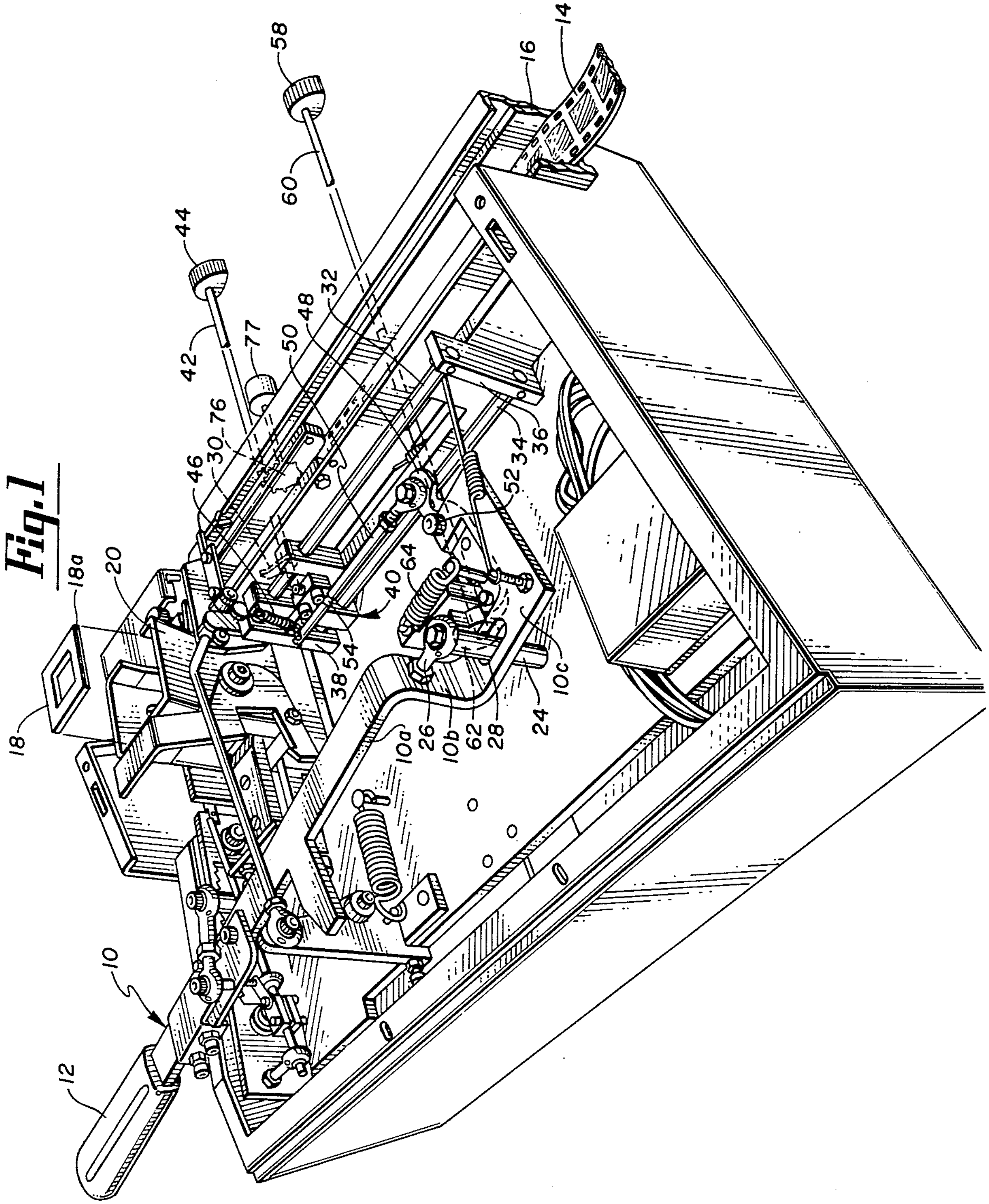
FIG. 1 is a pictorial view in perspective of the slide mounter of the present invention with top cosmetic cover removed.
Figure 2A:
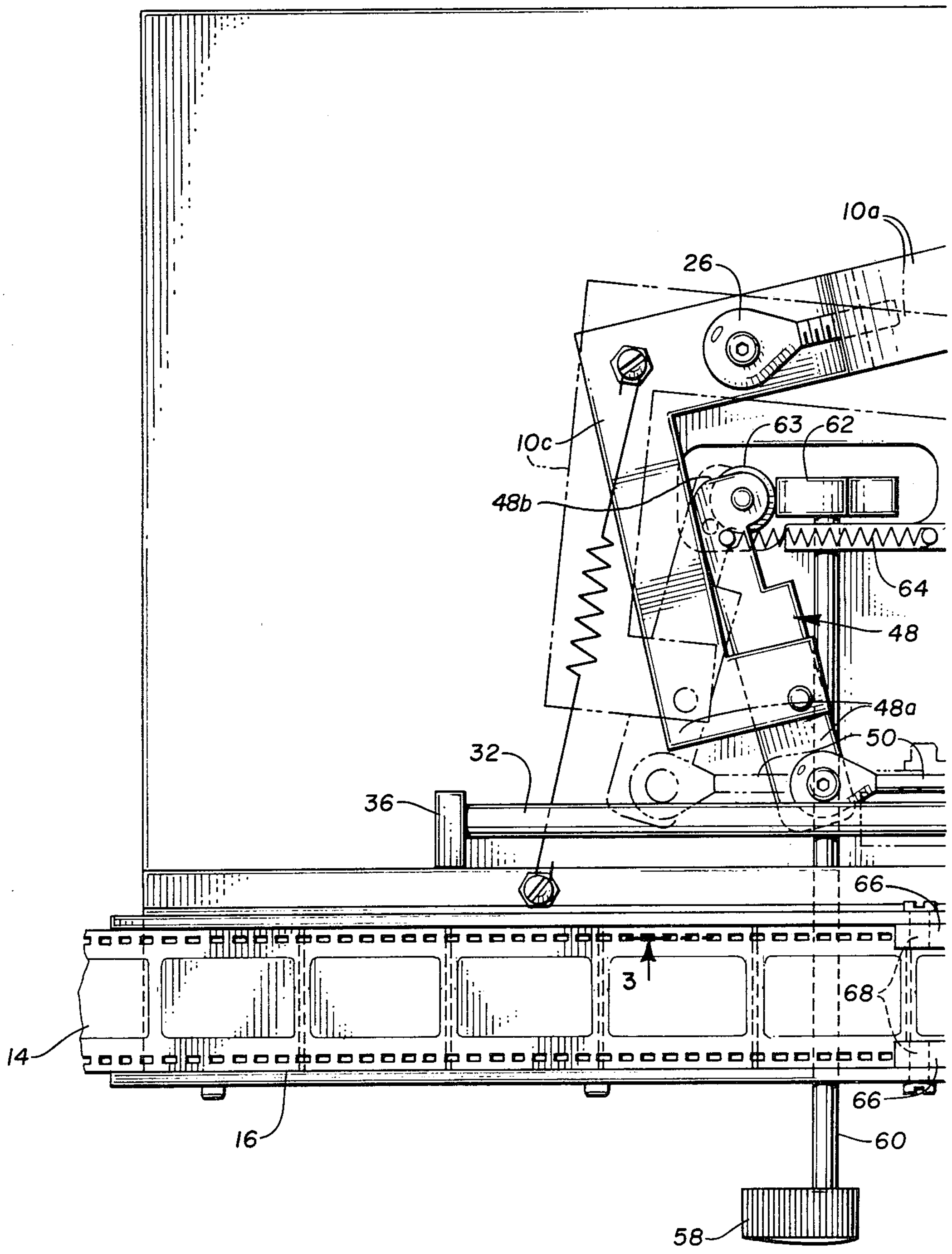
FIGS. 2A and 2B are a top plan view of the slide mounter of FIG. 1 with the side and bottom covers removed, parts broken away, and some elements shown in phantom line position.
Figure 2B:
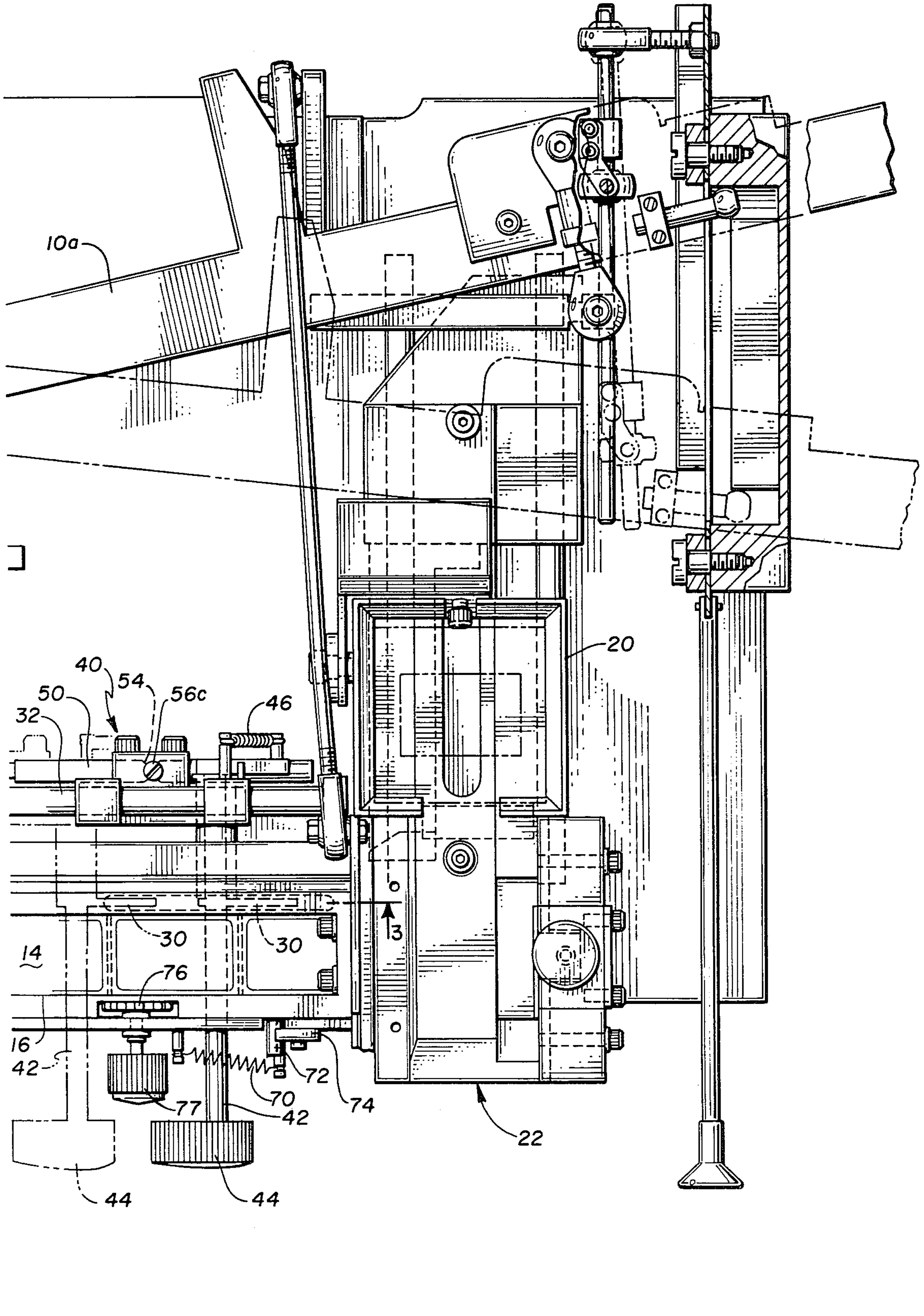

The perspective view of the slide mounter shown in FIG. 1 is viewed from the left rear corner of the slide mounter. FIGS. 2A and 2B, on the other hand, are a top view (in two halves) in which the front of the slide mounter is shown in the lower portions and the rear is shown at the upper portions of the drawings.

Operating lever 10 controls, through various linkage members, three major operating mechanisms of the slide mounter. The first mechanism is the film advance mechanism, which advances film web 14 along film track 16. The second mechanism is the knife actuating mechanism, which severs a transparency from film web 14. The third mechanism is the slide advance mechanism, which advances slide mount 18 from slide magazine 20 along slide track 22 (FIG. 2B). As slide 18 is advanced, an insertion opening along edge 18*a* of slide 18 is opened up to permit insertion of a transparency into slide 18.

The present invention is concerned with the film advance mechanism. A detailed description of the knife actuating mechanism and the slide advance mechanism may be found in the previously mentioned co-pending applications and is incorporated herein by reference.

Figure 3:
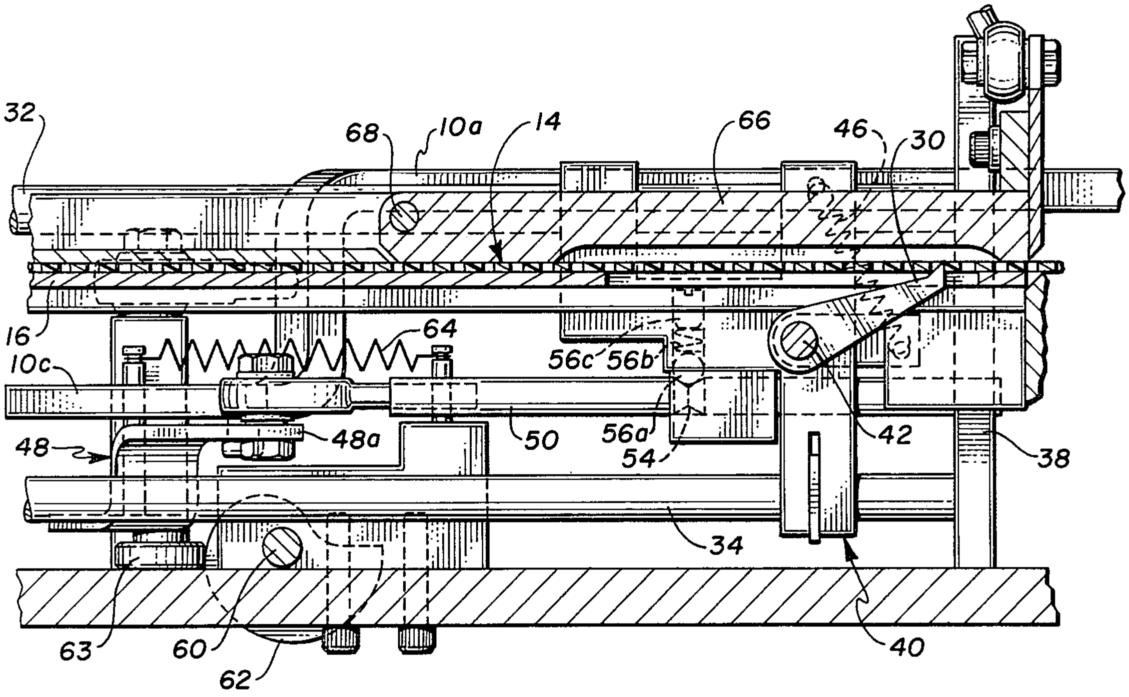
FIG. 3 is a sectional view of the film advance mechanism of the slide mounter taken along line 3—3 of FIGS. 2A and 2B.

In the film advance mechanism illustrated in FIGS. 1–3, lever 10 is pivotally connected to upstanding post 24 by universal link connection 26. Lever 10 has a first generally straight portion 10*a* to which handle 12 is connected at one end. At the opposite end of portion 10*a*, lever 10 has a downward turned portion 10*b*. Connecting link 26 is connected to portion 10*b*. Lever 10 has a third portion 10*c* which extends from downturned portion 10*b* and is generally parallel to portion 10*a*. Portion 10*c* has a general C-shape. Post 24 extends through slot 28 in lower portion 10*c* of lever 10.

The film advance mechanism is connected to and driven by lower portion 10*c* of lever 10. The film advance mechanism includes film advance pawl 30, which is movable along a path parallel to film track 16. Pawl 30 engages sprocket holes in film 14 to move film 14 along film track 16.

The path of movement of film advance pawl 30 is defined by guide rods 32 and 34, which are parallel to one another and to film track 16 and are supported at their ends by upstanding support members 36 and 38. Guide block carriage assembly 40 is slidably movable on the guide track defined by guide rods 32 and 34. Film advance pawl 30 is connected to shaft 42, which is pivotally connected to carriage assembly 40. At one end of shaft 42 is pawl release lever 44, which permits the operator to turn shaft 42, and thereby move pawl 30 out of engagement with film 14. At the opposite end of shaft 42 is bias spring 46, which biases shaft 42 and pawl 30 to a normal position in engagement with sprocket holes in film 14.

As carriage assembly 40 is moved on guide rods 32 and 34, shaft 42 and film advance pawl 30 are also moved. Carriage assembly 40 is connected to lever 10 through arm 48 and connecting link 50. Arm 48 is pivotally connected near its center to lower arm portion 10*c* by connector 52. In addition, arm 48 is pivotally connected at first end 48*a* to an end of connecting link 50. Near its opposite end, connecting link 50 has a notch 54 which is engaged by ball plunger 56 connected to guide block 40. Ball plunger 56 normally engages notch 54 so that guide block assembly 40 moves with the movement of connecting link 50. If, however, the resistance to forward movement of film 14 is so great that there is a danger of pawl 30 tearing the sprocket holes of film 14, ball plunger assembly 56 releases notch 54 so that guide block assembly 40 and pawl 30 are disconnected from connecting link 50.

As best shown in FIG. 3, ball plunger 56 preferably includes ball 56*a*, spring 56*b*, and adjusting screw 56*c*. By turning screw 56*c*, the operator can adjust the compression of spring 56*b*, and thus the force applied to ball 56*a* to retain ball 56*a* in notch 54. In this manner, the breakaway mechanism of the present invention can be adjusted so that it disconnects carriage 40 and link 50 only when resistance to forward movement of film 14 reaches a dangerous level. The ability to adjust the level at which carriage 40 and link 50 are disconnected is advantageous because the strengths of various types of photographic films differ significantly.

The distance that film 14 is advanced is adjusted by film framing lever 58, which is connected to one end of shaft 60. Cam 62 is connected to the opposite end of shaft 60, and rotates with shaft 60 as lever 58 is moved. Second end 48*b* of arm 48 has a roller 63 rotatably mounted thereon which is held in contact with cam 62 by bias spring 64. The position of lever 58 therefore, dictates the position of cam 62, and thus the stroke of first end 48*a* of arm 48 and the stroke of connecting link 50.

FIGS. 2A and 2B illustrate two positions of lever 10. In the position indicated by solid lines, carriage block assembly 40 and pawl 30 are at the forwardmost end of the film advancement (the "home position"), in a position similar to that shown in FIG. 1. In the position shown in phantom lines, guide block assembly 40 and pawl 30 have been moved back along track 16 to the beginning point of another film advancement. As can be seen from FIGS. 2A and 2B, the position of cam 62 controls the beginning and end positions of end 48*a* of arm 48, and thus the forwardmost and rearwardmost positions of carriage 40 and pawl 30.

The film advance mechanism also includes film guide flap 66, which is pivotally connected to track 16 by pivot pins 68. Bias spring 70, pin 72, and pin engaging lock 74 hold film guide flap 66 in a normal position parallel to track 16. In its normal position, flap 66 presses film 14 downward against the rails of track 16, and thus keeps film 14 in engagement with film advancement pawl 30. If insertion of film 14 onto mount 18 meets resistance which might lead to damage of the film, the upward force against pin 72 overcomes the spring bias of bias spring 70, and pin 72 is released by lock 74. As a result, the film flap 66 pivots upward about the axis defined by pivot pin 68. This permits film 14 to buckle and move out of engagement with pawl 30. Film insertion sprocket wheel 76 engages sprocket holes in film 14 and may be rotated by means of knob 77 to permit manual insertion of film 14 under film flap 66.

Although film guide flap 66 provides some protection against damage to film 14, it has two important drawbacks. First, the operation of flap 66 is position-dependent. In other words, it takes greater force to open film guide flap 66 when pawl 30 is at the beginning of its forward stroke than when pawl 30 is at the end of its forward stroke. This is because flap 66 is pivoted about pivot pin 68. An upward force on flap 66 near pivot pin 68 must be much greater than an upward force on flap 66 at the end furthest from pivot pin 68 in order to pivot flap 66 upward. Second, if the film supply reel of the film supply (not shown) fails to rotate for some reason, flap 66 will not prevent the film from being torn by pawl 30 if pawl 30 is at the beginning of its forward stroke.

The film advance breakaway mechanism of the present invention, which disconnects carriage assembly 40 from connecting link 50 when resistance to advancement of carriage 40 exceeds a predetermined amount, overcomes both of these shortcomings. It provides uniform protection against tearing film 14 by pawl 30 over the entire forward stroke of carriage 40. In addition, the breakaway mechanism of the present invention protects not only against jamming or binding occurring at the forward end of film 14 (where it is being inserted into slide mount 18), but also in the event of a malfunction of the film supply mechanism (not shown) which supplies film 14 to film track 16.

Although the present invention has been described with reference to preferred embodiments, workers skilled in the art will recognize that changes may be made in form and detail without departing from the spirit and scope of the invention. For example, although the preferred embodiment described in this application utilizes ball plunger 56 and notch 54, other means for disconnecting the carriage and the drive when resistance to advancement of the carriage exceeds a predetermined amount, are also contemplated by the present invention. For example, a magnetic latch can be used, so that when the resistance to advancement exceeds the magnetic force, the magnetic latch disconnects the carriage and the drive.

What is claimed is:

1. A film advance mechanism for advancing a photographic film web along a film track, the film advance mechanism comprising:
   - a guide track essentially parallel to the film track;
   - carriage means movable on the guide track between a first and a second end;
   - drive means for advancing the carriage means toward the first end during a portion of an operating cycle of the film advance mechanism and returning the carriage means toward the second end during another portion of the operating cycle;
   - film advance pawl means connected to and movable with the carriage means for engaging sprocket holes of the film web to advance the web as the carriage means advances; and
   - means for disconnecting the carriage means and the drive means when resistance to advancement of the carriage means toward the first end exceeds a predetermined amount.

2. The film advance mechanism of claim 1 wherein the means for disconnecting comprises ball plunger means and notch means, the ball plunger means normally engaging the notch means to connect the carriage means and the drive means, and moving out of engagement with the notch means, to thereby disconnect the carriage means and the drive means when resistance to advancement of the carriage means exceeds a predetermined amount.

3. The film advance mechanism of claim 2 wherein the ball plunger means is carried by the carriage means and the notch means is carried by the drive means.

4. The film advance mechanism of claim 3 wherein the drive means comprises operating lever means movable during the operating cycle and link means extending between the operating lever means and the carriage means and having the notch means therein.

5. The film advance mechanism of claim 2 wherein the ball plunger means comprises a ball for engaging the notch means, spring means for applying a spring force to the ball, and adjusting means for adjusting the spring force to adjust thereby the predetermined amount of resistance to advancement of the carriage means at which the ball moves out of engagement with the notch means.

6. The film advance mechanism of claim 1 wherein the means for disconnecting comprises:
   - releasable connection means for connecting the carriage means and the drive means so long as resistance to advancement of the carriage means toward the first end does not exceed a predetermined amount and for releasing the carriage means and the drive means from connection when resistance to advancement of the carriage means toward the first end exceeds the predetermined amount.

7. The film advance mechanism of claim 6 wherein the means for disconnecting further comprises:
   - adjusting means for adjusting the predetermined amount of resistance to advancement of the carriage means at which the releasable connection means releases the carriage means and the drive means from connection.

* * * * *